No. 700,105. Patented May 13, 1902.
G. N. VIS.
VACUUM EVAPORATING APPARATUS.
(Application filed Dec. 23, 1899.)
(No Model.) 2 Sheets—Sheet 1.
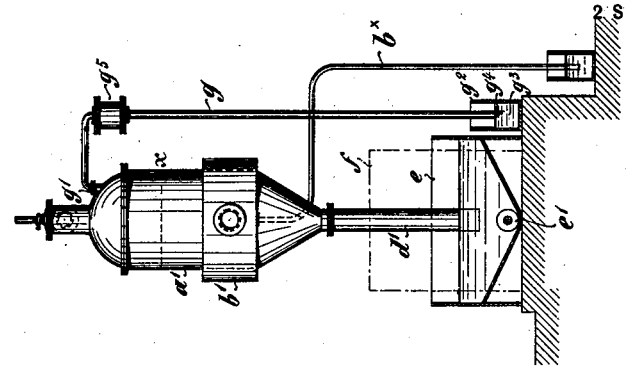
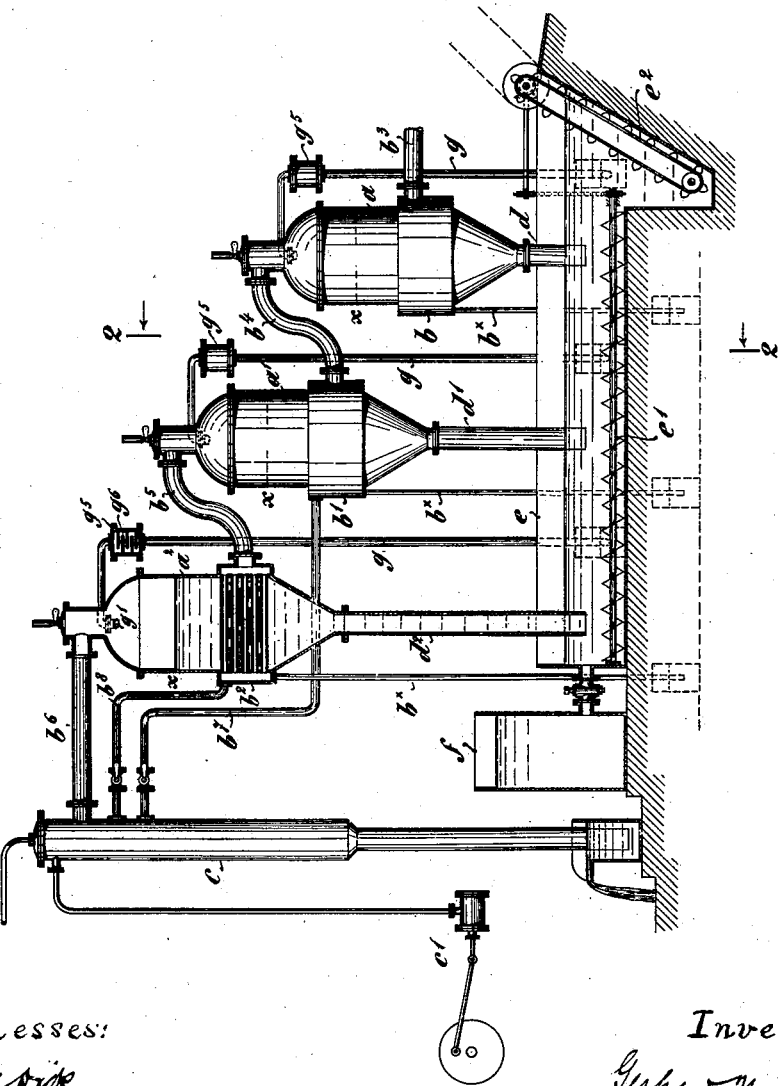

No. 700,105. Patented May 13, 1902.
G. N. VIS.
VACUUM EVAPORATING APPARATUS.
(Application filed Dec. 23, 1899.)
(No Model.) 2 Sheets—Sheet 2.
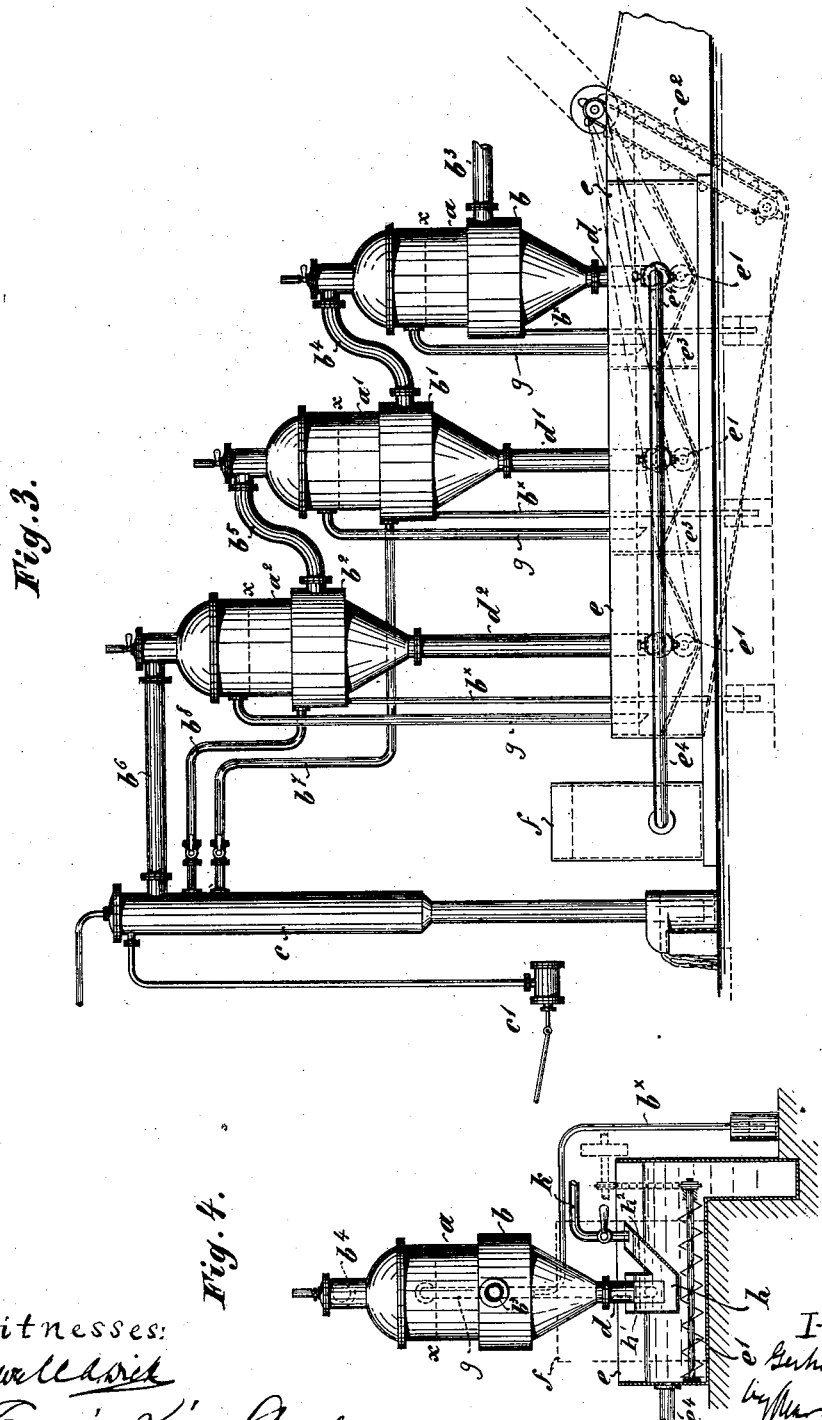

UNITED STATES PATENT OFFICE.

GERHARD NICOLAAS VIS, OF SCHWEIZERHALLE, SWITZERLAND.

VACUUM EVAPORATING APPARATUS.

SPECIFICATION forming part of Letters Patent No. 700,105, dated May 13, 1902.

Application filed December 23, 1899. Serial No. 741,417. (No model.)

*To all whom it may concern:*

Be it known that I, GERHARD NICOLAAS VIS, doctor of philosophy, chemist, a subject of the Queen of the Netherlands, residing at Schweizerhalle, near Basle, Switzerland, have invented a new and useful Improved Vacuum Evaporating Apparatus for Separating Common Salt (Chlorid of Sodium) from Solutions, Especially from Brine, of which the following is a specification.

The present invention relates to vacuum apparatus for separating sodium chlorid (common salt) from solutions, especially from brine, previously freed from its gypsum; and its object is to enable continuous working in a more advantageous manner than heretofore, especially with a view to apparatus comprising a series of pans connected to work on the so-called "multiple-effect" principle—that is to say, in which the vapors of water or steam generated from the brine in a preceding pan are utilized as the heating medium in the next pan of the series. In apparatus of this kind, in which the salt is caused to separate out in the pan and the latter is provided with an internal system of heating-pipes, it is of the highest importance for continuous working that the formation of salt crusts on the heating-pipes and the inner wall of the pan, which it is impossible to prevent, should be retarded as much as possible and that when they have obtained such thickness as to impede the transmission of heat from said pipes to the brine they should be quickly and efficiently removed, and this without the aid of water, in order to avoid the necessity of a special concentration of thin wash to reobtain the salt therefrom. In order to obtain these results in a simple and effective manner, the present invention essentially consists in providing the bottom of the pan with a tubular extension or leg, which is arranged to dip into the brine in a brine-reservoir below and constitutes the normal supply-pipe of the pan, and in combining with the pan means for periodically destroying the vacuum therein, so that the brine contained in the pan is caused to rapidly sink, with the effect of pushing the separated salt, which collects for the greater part in the conical bottom portion of the pan, from the latter into the said supply-reservoir, which is provided with a device for conveying the received salt to the outside. To obtain this salt-discharging action, I connect the top of vacuum space of the pan with an air-pipe the lower end of which is normally hermetically closed to the atmosphere by means of a seal formed of a body of liquid, preferably a non-incrusting liquid, such as water, glycerin, mercury, and the like. For pushing out the separated salt from the pan a stronger vacuum is caused to take place in the pan, with the effect of unsealing the lower end of the air-pipe, so that air rushes through said pipe into the pan, whereby the vacuum is destroyed, and consequently the brine caused to sink back. As a consequence of the destruction of the vacuum in the pan the seal of the air-pipe and the vacuum in the pan are caused to be reëstablished at once, as hereinafter more fully described. The said air-pipes are of high importance in connection with apparatus working on the multiple-effect principle, as they allow the removal of salt from one pan of the series to be effected without disturbing the normal level of brine in the other pans. When with the multiple-effect apparatus salt is removed from a pan in the manner described, the subsequent pan will not be properly fed with heating-steam from said pan during the removal of the salt, and consequently will not generate as much steam from its brine as under normal conditions, so that the counter force it normally opposes to the action of the air-pump or vacuum-creating apparatus is reduced, and the action of the latter therefore results in a higher vacuum, whereby a greater proportion of brine is sucked in, and consequently the level of the brine is raised above the normal level, with the effect of disturbing the action of the pan. Now this increasing of the vacuum at once causes the air-pipe of the pan in question to intervene as a "compensator"—that is is to say, the lower end of said air-pipe becomes unsealed, and consequently air rushes through it into the pan, with the effect of causing the brine to reassume its normal level.

I prefer to combine with the air-pipe means for preventing liquid from being drawn from said pipe into the pan, such means preferably consisting in an enlargement of said pipe situated above the normal level of the liquid therein and provided with baffle-plates, either horizontal or inclined.

The periodical removal of the salt crusts formed on the heating-pipes and the inner wall of the pan is according to this invention provided for as follows: For each pan there is a removable U-shaped pipe, both legs of which are open. One of the legs is of such width that it can be placed over or receive the tubular leg or extension of the pan. The other leg serves for the filling in of cold brine from a brine-supply. To wash the pan, the latter is emptied, the wide leg of the U-shaped pipe placed over the pan-leg, and the other leg of said pipe supplied with cold brine, the latter being sucked in the pan by restarting the pump, as will be more fully described hereinafter.

A modified form of carrying out the invention would consist in connecting with the top of the pan a pipe which descends into the normal supply-reservoir and serves as the air-pipe, dipping with its lower open end into the brine. This modification is, however, of minor value, as the air-pipe is apt to be frequently obstructed by incrustations.

On the annexed two sheets of drawings, Figure 1 represents in a diagrammatical manner an elevation, partly in section, of a treble-effect apparatus organized according to the preferred form of my invention. Fig. 2 is a vertical section through line 2 2, Fig. 1, looking in the direction of the arrow, the last pan, &c., on the left-hand side of said line being omitted for clearness sake. Fig. 3 represents in a diagrammatical manner an elevation of a modified form of the apparatus; and Fig. 4 is a sectional side elevation of the first pan of the apparatus shown in Fig. 3, illustrating the use of the two-legged washing-pipe applied to the supply-leg of the pan.

In the figures similar letters of reference are used to indicate corresponding parts.

$a$ $a'$ $a^2$ are the three pans, provided each with an internal system of heating-pipes lettered, respectively, $b$ $b'$ $b^2$. The heating-pipes of the first boiler $a$ are connected through a pipe $b^3$ with a steam-generator, (not shown in the drawings,) while the heating-pipes of the second and third pans are connected by pipes $b^4$ and $b^5$, respectively, with the top of the first and second pan, as usual in apparatus of this kind. The water formed by condensation in the heating-pipes is carried off through descending pipes $b^\times$, dipping into vessels that are open to the atmosphere. The last pan of the series or pan $a^2$ is connected at its top through a pipe $b^6$ with a condenser $c$, preferably constructed after the so-called "cataract" system, with which condenser are also connected the systems of heating-pipes of the pans $a'$ and $a^2$ through cock-controlled pipes $b^7$ $b^8$, respectively. The condenser itself is connected with the air-pump $c'$. The organization thus far described is well known to those skilled in the art, and therefore need not be described in a more detailed manner.

The pans are preferably constructed in the form of upright cylinders. Each is provided with a conical bottom, from which a tubular extension or leg, lettered, respectively, $d$ $d'$ $d^2$, descends into a reservoir $e$, fed with brine from a main reservoir $f$. The reservoir $e$ is open to the atmosphere and the said legs dip with their open mouth into the brine. In Fig. 1 there is a common reservoir $e$; but obviously a separate reservoir may be provided for each pan—for instance, by subdividing the reservoir by transverse walls into three compartments and connecting each compartment with the main reservoir.

$e'$ is a conveyer arranged in the reservoir $e$ for carrying the salt received from the pans to an elevator $e^2$, which delivers the salt to a drying plant, (not shown,) all as well known to those skilled in the art.

The action of the condenser is preferably so regulated that there is a difference of level in the several pans as compared with each other—for instance, so that the level in the pan $a$ is at a height of four meters, in the pan $a'$ at a height of about eight meters, and in the pan $a^2$ at a height of about twelve meters.

$g$, Figs. 1 and 2, is the "air-pipe," one for each pan. It starts from the top portion of the pan, as at $g'$, Fig. 2, and extends downward into the vessel $g^2$, which is open to the atmosphere and contains a body of a non-incrusting liquid $g^3$—such as water freed from salts, glycerin, mercury, and the like—into which liquid dips the open end $g^4$ of pipe $g$, said end being preferably cut sloping. The vessel $g^2$ must be given such a capacity and filled with so much liquid that the latter can rise in the pipe $g$ to the level corresponding to the normal vacuum in the pan without unsealing the air-pipe and that all the liquid can be received in the vessel when the vacuum in the pan is destroyed. Preferably there is interposed in pipe $g$ a vessel or chamber $g^5$ at some distance above the normal level of liquid in pipe $g$. This vessel or chamber has the function of preventing liquid from being withdrawn from the pipe $g$ into the pan. It is preferred to provide the chamber $g^5$ with baffle-plates $g^6$, Fig. 1, (pan $a^2$,) alternating with each other and arranged either horizontally, as shown, or in an inclined position.

The boiling operation starts with exhausting the pans, so that the brine can fill up the same to the proper level by rising therein from the reservoir $e$ through the legs $d$ $d'$ $d^2$. Simultaneously non-incrusting liquid will be drawn from the vessels $g^2$ into the pipes $g$. The heating-pipes $b$ of pan $a$ are then supplied with live steam of from 100° to 130° centigrade. The brine in $a$ becomes boiling, and the steam generated therefrom passes over into the heating-pipes $b'$ of pan $a'$ and causes the brine contained in the latter to boil, and the steam thus generated in pan $a'$ passes over into the heating-pipes $b^2$ of boiler $a^2$, whereby the brine in this boiler is caused to boil, the steam from this brine being absorbed by the condenser $c$.

Assuming that after a period of boiling so much salt has been separated out in the pan $a$ as to require removal, the vacuum in the pan $a$ is suddenly strengthened by adjusting its connection with the condenser, as is well understood by those skilled in the art, and thereby so much liquid is drawn from the corresponding vessel $g^2$ into its pipe $g$ that the end of the latter becomes unsealed and air rushes through said pipe into the pan $a$, destroying the vacuum therein and causing thereby the brine therein to rapidly sink down, whereby the separated salt, the greater part of which had accumulated in the conical bottom part of the boiler, is driven out from the latter through leg $d$ into the reservoir $e$. As in pan $a$, the brine when its level is thus lowered is out of contact with the heating-pipes $b$, no hot steam will be generated in this pan, so that the heating-pipes $b'$ of pan $a'$ are no longer fed with hot steam, which has the effect of reducing the generation of steam in the pan $a'$, and consequently the counter-pressure to the action of the condenser and connected pump, with the result that a greater amount of brine than the normal is sucked into the pan $a'$ from the reservoir $e$. The same occurs in the pan $a^2$. Now this increased action of the vacuum-generating apparatus is simultaneously exerted upon the air-pipes $g$, connected with the pans $a'$ and $a^2$, so that said pipes become unsealed, and air is allowed to penetrate into said pans, whereby the vacuum therein is reduced, with the effect of lowering the level of brine in said pans and resealing their air-pipes. Obviously this raising and lowering of level in the pans $a'$ and $a^2$ will continue until the pipes $b'$ and $b^2$ are supplied again with hot steam. This takes place after a short interval, as the destruction of the vacuum in pan $a$, which caused the generation of hot steam to be stopped, has the effect of causing the liquid column in the pipe $g$, connected with pan $a$, to rush back and to thus reseal said pipe, so that the connection of the pan with the vacuum apparatus having been readjusted without interrupting it the vacuum is reestablished in pan $a$ and the latter refilled with brine from the reservoir $e$.

When it becomes necessary to remove the salt crusts formed, the vacuum-generating apparatus is stopped, so that the brine flows from the pans back into the reservoir when the double-legged U-shaped pipes $h$ are used, as shown in Fig. 4, in connection with the pan $a$—that is to say, the pipes $h$ are placed with the wider one of their legs $h'$ over the extensions $d$ $d'$ $d^2$ of the pans and the other legs $h^2$ fed with cold brine by means of a cock-controlled supply $k$, communicating with the reservoir $f$, or with a special brine-reservoir. When the pipe $h$, filled with brine, is so as to seal the extension $d$, the pump is restarted, so as to rapidly suck brine into the pan from the pipe $h$. After the brine has filled the pan up to the level $x$ the supply $k$ is stopped, the pipe $h$ removed, and the normal operation continued. By the rapid contact of the cold brine with the hot crusts the latter are checked, caused to crack, and burst and simultaneously brine penetrates the fissures. By this chilling action by far the greater part of the crusts is caused to detach and drop off from the pipes and walls. The remainder is rapidly dissolved away when the brine refilling the pan becomes hot.

In the modified form of apparatus shown in Figs. 3 and 4 the vessel $g^2$ is dispensed with and the pipe $g$ extended down into the brine contained in the reservoir $e$. With this arrangement I prefer to subdivide the reservoir $e$ by walls $e^3$ in chambers, as indicated with dotted lines, Fig. 3, so that each pan is supplied with brine from a special chamber, the several chambers communicating with the reservoir $f$ through a common supply-pipe $e^4$ and being each provided with a conveyer $e'$.

What I claim herein as new, and desire to secure by Letters Patent, is—

1. In vacuum apparatus for obtaining salt from brine, the combination, with a pan provided with an internal system of heating-pipes and having its bottom constructed with a tubular extension, and a supply-reservoir arranged below said extension for receiving the same and communicating with the atmosphere, of an air-pipe descending from the top of the pan, and a liquid seal for the lower end of said air-pipe, substantially as and for the purpose specified.

2. In vacuum apparatus for obtaining salt from brine the combination, with a pan provided with an internal system of heating-pipes and having its bottom constructed with a tubular extension for receiving the same and communicating with the atmosphere, of an air-pipe descending from the top of the pan, a non-incrusting liquid seal for the lower open end of said air-pipe, and means for preventing liquid from being drawn from said air-pipe into the pan, substantially as and for the purpose specified.

3. In vacuum apparatus for obtaining salt from brine the combination of a pan provided with an internal system of heating-pipes, and provided at the bottom with a tubular leg or extension, an open supply-tank below into which the said leg dips, an air-pipe communicating with the top of the pan and a liquid seal for the lower open end of said air-pipe; a removable double-legged "washing-pipe" one leg of which is adapted to be placed over the said tubular leg of the pan, and a cock-controlled brine-supply for the other leg of said double-legged pipe, substantially as and for the purpose hereinbefore set forth.

In testimony whereof I have hereunto set my hand in presence of two subscribing witnesses.

GERHARD NICOLAAS VIS.

Witnesses:
GEORGE GIFFORD,
JOHN G. PLATNER.